United States Patent [19]

Skaalen et al.

[11] Patent Number: 4,599,030
[45] Date of Patent: Jul. 8, 1986

[54] MARGINAL TERRAIN STRADDLE-LIFT CONTAINER HANDLER

[75] Inventors: Clifford I. Skaalen, Oxnard; Herman G. Lange, Camarillo; Preston S. Springston, Oxnard, all of Calif.

[73] Assignee: The United States of America as represented by the Secretary of the Navy, Washington, D.C.

[21] Appl. No.: 718,762

[22] Filed: Apr. 1, 1985

[51] Int. Cl.$^4$ .............................................. B60P 3/00
[52] U.S. Cl. ................................... 414/460; 180/906;
180/236; 180/238; 180/140; 180/24; 180/242;
180/265; 187/9 R; 187/8.5; 187/8.59; 212/220;
212/214; 294/81.41; 414/592
[58] Field of Search ...................... 294/81.41; 414/458,
414/459, 460, 461, 498, 495, 592; 187/9 R, 8.59,
8.49, 8.5; 212/220, 221, 218, 213, 206, 216, 217,
214; 180/906, 233, 234, 236, 238, 140, 24, 237,
241, 242, 239, 264, 265

[56] References Cited

U.S. PATENT DOCUMENTS

| | | | |
|---|---|---|---|
| 2,209,804 | 7/1940 | Ashley | 180/906 X |
| 3,146,903 | 9/1964 | Bjorklund | 414/460 |
| 3,197,229 | 7/1965 | Houlton | 414/460 X |
| 3,305,116 | 2/1967 | McKee | 180/236 X |
| 3,482,720 | 12/1969 | Tax et al. | 414/460 |
| 3,688,931 | 9/1972 | Tax et al. | 414/460 |
| 4,087,013 | 5/1978 | Wiley, Jr. | 414/459 |
| 4,219,094 | 8/1980 | Sturgill | 414/460 X |
| 4,328,951 | 5/1982 | Laupper | 187/8.5 X |
| 4,378,958 | 4/1983 | Mauldin | 414/461 |
| 4,433,952 | 2/1984 | Glicuman | 414/460 |

FOREIGN PATENT DOCUMENTS 96133  12/1983  European Pat. Off. ............ 414/460

Primary Examiner—Frank E. Werner
Attorney, Agent, or Firm—Robert F. Beers; Joseph M. St. Amand

[57] ABSTRACT

A highly maneuverable straddle carrier vehicle structure is provided for handling various sizes of containers and outsized loads over rough, unleveled, weak and unprepared soils to meet austere requirements which are beyond the capability of commercial straddle lifts that normally operate on prepared surfaces within specific boundaries of yards and docks. Features include high flotation tires capable of operation over marginal terrain, fording capability, all wheel 360 degree steering and offset wheel yokes which permits automatic changing of wheelbase dimensions for rugged sloping terrain operations and wheel positioning for optimum mobility including lateral and oblique movement and vehicle rotation within its own length for a variety of close quarters operations. Load stabilization devices permit container securing during transit and hinged transverse members operate to reduce torsion and bending moments on the vehicle structure over severe terrain.

16 Claims, 12 Drawing Figures

4,599,030

MARGINAL TERRAIN STRADDLE-LIFT CONTAINER HANDLER

BACKGROUND OF THE INVENTION

The present invention relates to container handling systems used for transporting large standardized containers, and in particular to a straddle carrier vehicle for efficiently handling and transporting such containers over a variety of terrains and near-shore surf-zones during military operations.

Planning for the logistics support to sustain major contingency operations, including amphibious assault operations and logistics over-the-shore evolutions, rely extensively on the utilization of commercial type containers for logistics transport. Maximum usage of standard 8'×8'×20' steel containers up to and including 8'×8'×45' containers and a variety of sub modules such as sixcons, quadcons, tricons, and halfcons for packaging, storage and shipment of materials and equipment is desired. Logistics planning to support advance/amphibious assault operations includes expedient utilization of reasonably level but otherwise unprepared natural terrain as material storage sites. There are problems in transporting standard containers from landing areas to dump sites and container handling on natural terrain materials expeditiously under combat conditions using prior art container handling vehicles.

Prior art straddle carrier vehicles are primarily designed for hoisting and lowering containers in freight yards or docks having relatively hard flat storage areas and not for use under conditions of rough or uneven terrain and/or unstabilized soils.

Old methods of handling containers on marginal terrain involved soil trafficability thinking and resultant excessive use of soil stabilization methods to strengthen weak soils. Industrial applications stressed soil trafficability, and the container handlers which evolved from the soil trafficability thinking possess none of the characteristics inherent in the present invention.

SUMMARY OF THE INVENTION

The marginal terrain container handler of this invention is a vehicle structure of a specific aggressive design for beach and inland operations on unprepared soil for handling various sizes of containers and outsized loads in logistics functions. The marginal terrain container handler was created to lift, handle and haul all sizes of containers based on the standard 8 ft wide denominator, over rough, unleveled and weak soils usually found in unchannelized areas of typical advanced base operations. This vehicle is uniquely designed to meet austere requirements which are beyond the capability of commercial straddle lifts that normally operate on prepared surfaces within specific boundaries of yards and docks. Features include high flotation tires capable of operation over marginal terrain, fording capability, offset wheel yokes, all wheel 360 degree independent steering suitable for close quarters operations in container marshalling yards, a changeable wheelbase for operations on rugged sloping terrain, and load stabilization that permits container securing during transit. In addition, hinged transverse stiffening members for vehicle structure reinforcing on severe terrain is provided.

DESCRIPTION OF THE PREFERRED EMBODIMENT

Figure 1:
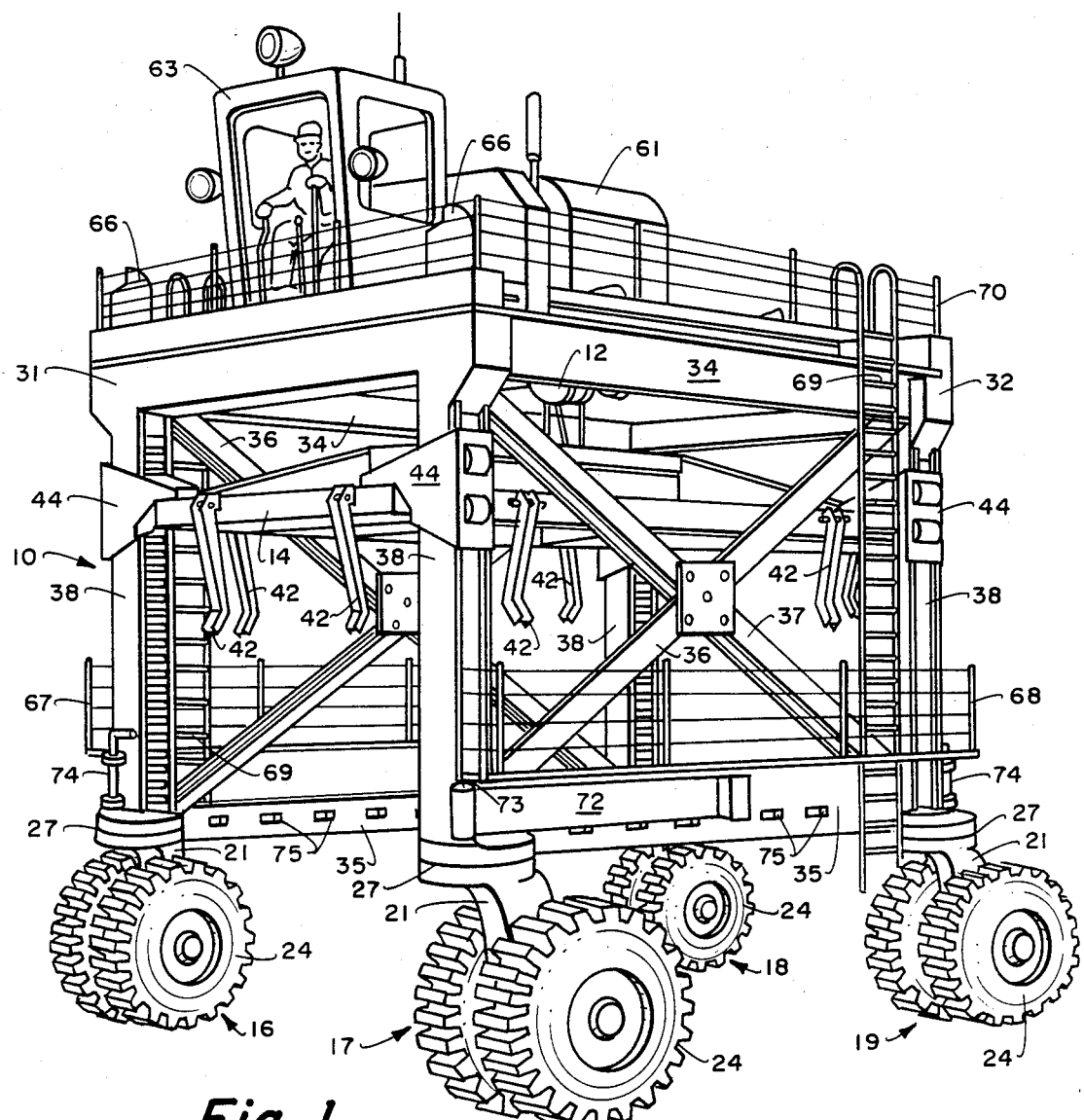
FIG. 1 is an illustration of a preferred embodiment of the marginal terrain straddle-lift container handling vehicle of the present invention.
Figure 7:
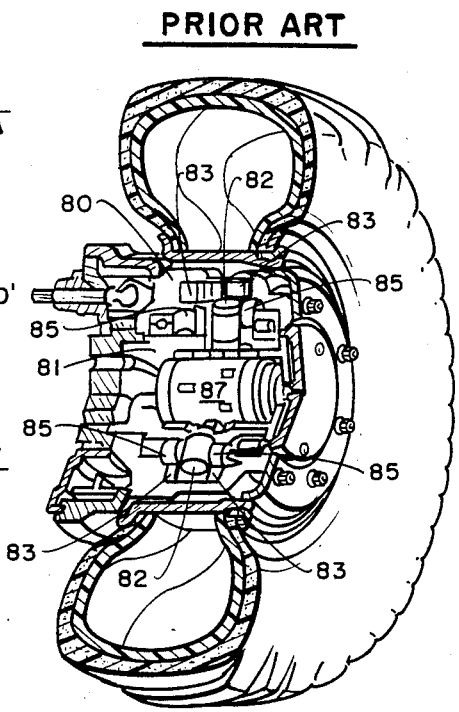
FIG. 7 is a cutaway illustration of a typical wheel assembly hydrostatic drive motor.
Figure 8:
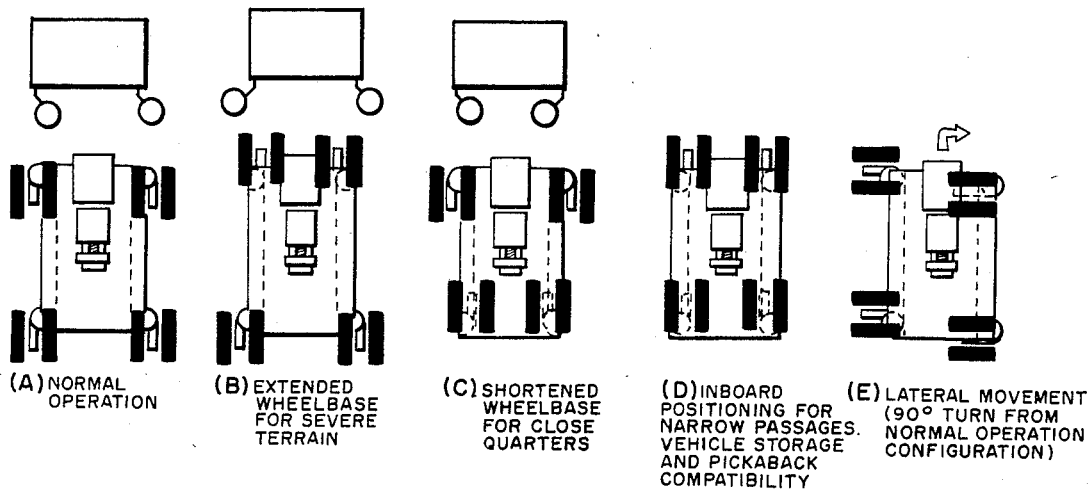
FIG. 8 shows examples of the many wheel positions available with the vehicle illustrated in FIG. 1 together with some of the types of offset caster steering.
Figure 8:
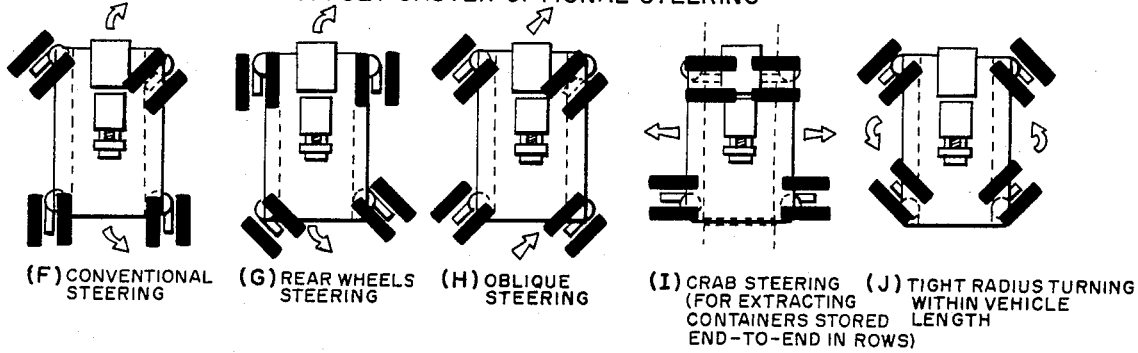

The marginal terrain straddle-lift container handler of this invention, shown particularly in FIG. 1, comprises a four wheel straddle vehicle 10 which includes a heavy duty crane hoist 12, and a container latch-on spreader frame 14. (Like numerals refer to like parts in each of the figures of drawings.) The four wheel assemblies 16, 17, 18 and 19 each consist of offset wheel supporting yokes 21, independent hydrostatic drive motors (such as shown in FIG. 7), and a pair of high flotation tires 24. The wheel assemblies 16, 17, 18 and 19 are each operable to be independently rotated by 360 degrees at the mounting interface 27 between the yoke 21 and the straddle-lift structure for a variety of modes of operation, such as shown in FIG. 8 and hereinafter described.

The straddle-lift vehicle superstructure rides on the four wheel assemblies, as shown, and comprises two inverted U-shaped frames 31 and 32, one fore and one aft, connected together on either side by upper sidebeam members 34 and lower sidebeam members 35. Crossbeams 36 and 37 provide additional rigidity to the inverted U-shaped framework of the superstructure. The legs 38 of the inverted U-shaped frames 31 and 32 are constructed from I-beams, for example, and either box-beam, I-beam or other suitable construction may be used for the remainder of the U-shaped frames and the upper and lower sidebeams as well as for the crossbeam members. The superstructure supports the crane hoist 12 (a 20-ton lift capability crane, for example) which is used to raise and lower the latch-on spreader frame 14, with or without a cargo container load.

Figure 2:
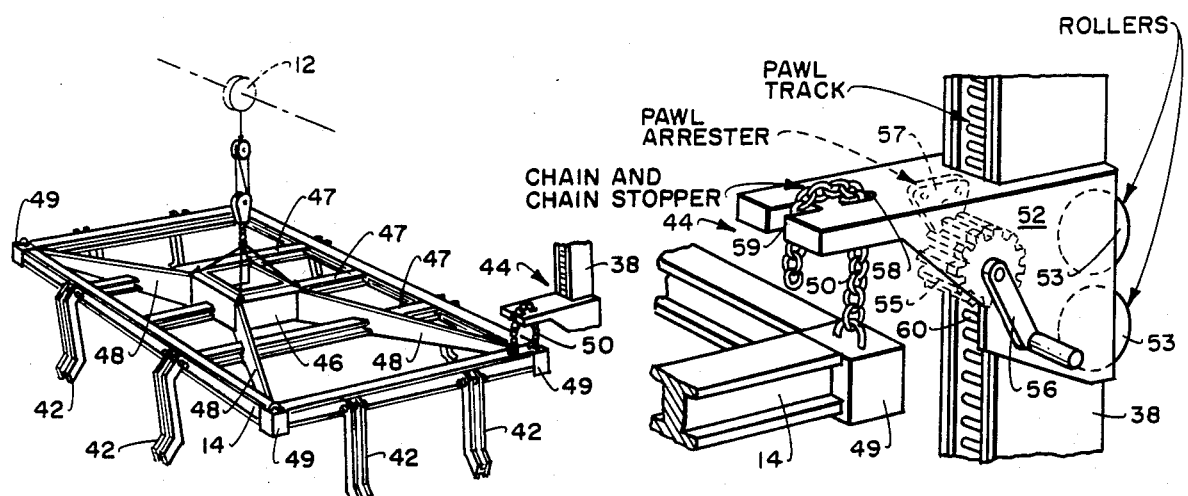
FIG. 2 shows the cargo container lifting and lashing gear assembly for the vehicle illustrated in FIG. 1.
Figure 3:
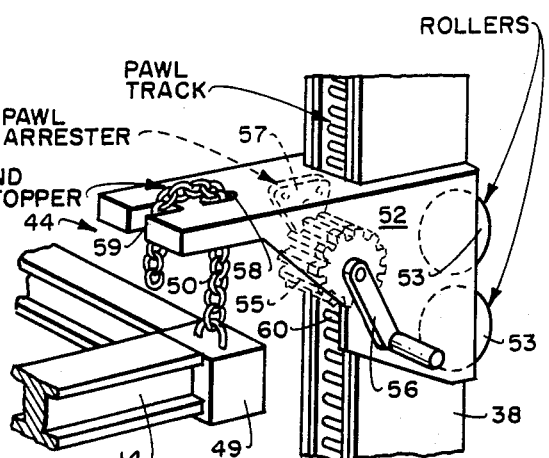
FIG. 3 is an enlarged and detailed view of the ratchet pawl and rollers assembly shown in FIGS. 1 and 2.

The latch-on spreader frame 14, in FIG. 1, is container fitted especially for the 8'×20' size standard cargo container (such as cargo container 39 shown in FIG. 12, for example), but may be adjusted to accommodate various containers up to the 8'×45' size. Guides 42 are located around the perimeter of spreader frame 14 to assist in the positioning and loading of cargo containers. Typical container lifting and lashing gear for container lifting and securing in transit is illustrated more clearly in FIGS. 2 and 3. This gear comprises a spreader frame 14 with guides 42, ratchet pawl and roller assemblies 44, and crane hoist 12. Spreader frame 14 includes a sheave box 46 with horizontal structure members 47 (using 6" I-beam construction, for example) and steel stiffeners 48. Hoist 12 attaches to the spreader frame via sheave box 46, and may be disengaged from the spreader frame once the spreader frame is secured in position on legs 38 of the superstructure during cargo transit; this allows the hoist to be used for break-bulk cargo handling. The spreader frame is attached at each corner 49 to a respective leg 38 of the straddle vehicle with a ratchet pawl and rollers assembly 44 using a chain 50.

The ratchet pawl rollers assemblies 44 each comprise a pawl assembly frame 52, and a pair of I-beam rollers 53, encased in frame 52, which ride in one side of an I-beam leg 38. A pawl 55, mounted in frame 52 on the opposite side of each leg 38, is provided with a crank 56 and pawl arrestor 57 for locking the assemblies 44 in desired positions on legs 38. At each corner of spreader frame 14 a chain 50 passes through a hole 58 and fastens to chain stopper 59 on a respective pawl frame 52 to secure the spreader frame to the pawl assembly. Thus the pawl assembly on each of the four legs 38 of the vehicle structure is connected by a chain 50 to a respective corner 49 of the spreader frame. Each pawl 55 rides on a pawl track 60 provided in each of the respective vertical I-beam legs 38. Once the four corners of the spreader frame are secured to respective pawl assemblies 44, and the pawl assemblies locked in place on legs 38, hoist 12 can be disengaged from sheave box 46. This relieves the hoist from bearing the cargo load during transit of the straddle-lift vehicle. The spreader frame system which includes the pawl assemblies also provides for transverse structural stability.

Figure 4:
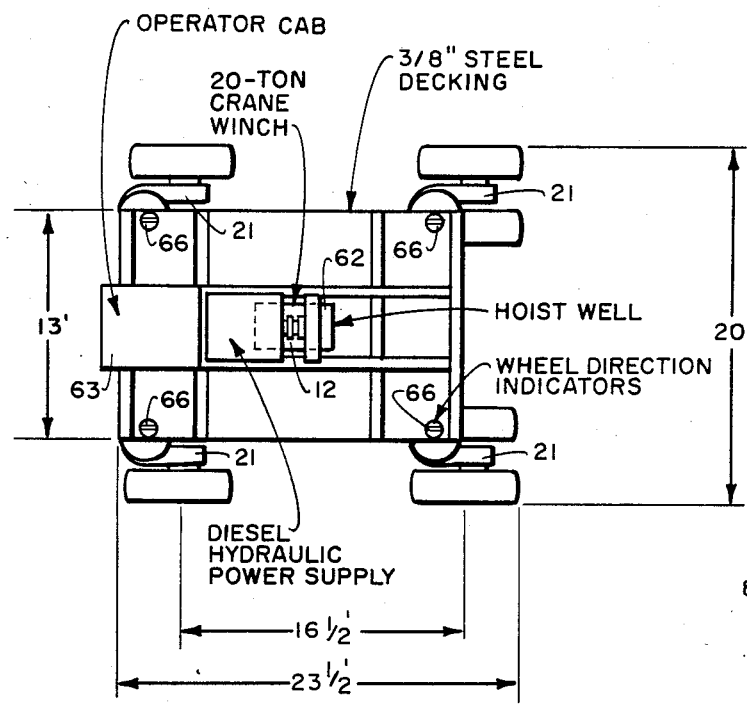
FIG. 4 is a top plan view of the vehicle illustrated in FIG. 1.

A diesel/hydraulic power supply 61 which powers the hoist 12 and the wheel assemblies 16, 17, 18 and 19 (hereinafter more fully described) is mounted at the top of the vehicle superstructure, as shown in FIGS. 1 and 4, and is located above hoist well 62.

The operator cab 63 is also located on top so that the operator can see the outside of the vehicle to avoid collisions with containers on the exterior. The cab is located at the front of the vehicle structure to permit viewing of container contact points (i.e., corner posts/legs 38) when attaching the lift mechanism (i.e., spreader frame system 14). The operator must be able to see at least two corners of the container upon which he is lowering another. Wheel direction indicators 66 for the 360 degree hydro-steering mechanisms are located atop the straddle vehicle at each corner and can readily be viewed by the operator.

Figure 5:
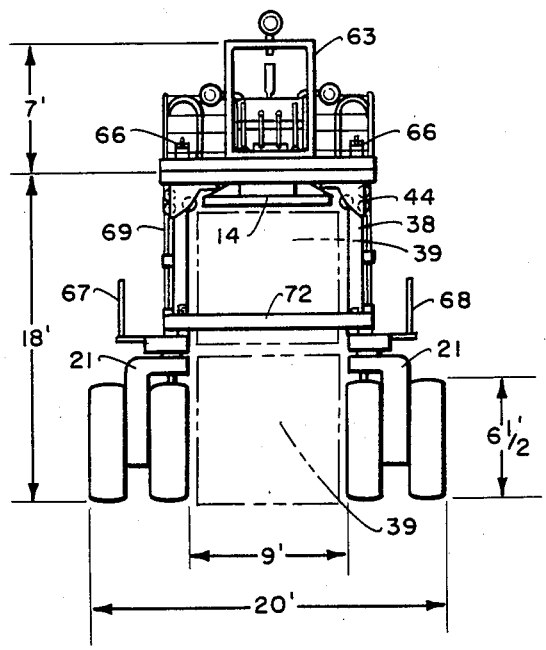
FIG. 5 is a front view of the vehicle shown in FIG. 1 showing positioning of cargo containers, and showing structure reinforcing bar in closed position.
Figure 6:
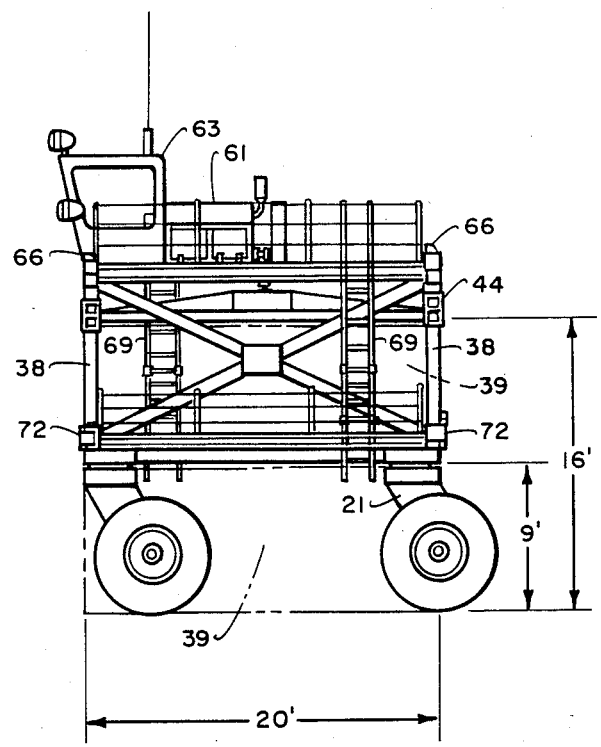
FIG. 6 is a side view of the vehicle illustrated in FIG. 1 showing cargo container positioning as in FIG. 5.

Catwalks 67 and 68 may be provided at either side of straddle vehicle 10, as shown in FIGS. 1, 5, and 6, and ladders 69 are provided for operator and service crew access to the cab 63 and power supply 66 at the top.

Safety rails 70 are also provided around the top of the straddle vehicle. A transverse structure reinforcing bar 72 is provided fore and aft on vehicle 10 when used on severe terrain. Bar 72 is hinged at 73 and when placed in use is swung into a closed position across the front and/or rear of the vehicle and secured into place with a locking mechanism 74. Each of the lower side beam members 35 is provided with a series of through container base slots 75 which hold insertable cross bars permitting the vehicle to be used like a truck for long hauls, on severe terrain or for break-bulk container handling. The positioning of cargo containers 39 beneath vehicle 10 for stacking or hauling is generally illustrated by dashed lines in FIGS. 5 and 6. The dimensions shown in FIGS. 4, 5 and 6 are given by way of example and compare the vehicle size to that of the typical standard 8'×8'×20' cargo container.

Each of the wheel assemblies 16, 17, 18 and 19 is provided with independent hydrostatic drive motors. Any suitable type hydrostatic drive motor can be used; however, one satisfactory hydraulic motor for use with the straddle-lift vehicle is a Hagglunds wheel hub radial piston type motor with a rotating housing, such as illustrated in FIG. 7, for example. In general, these wheel hub type hydraulic motors are radial piston type motors with a rotating housing 80 carried on a stationary cylinder block 81 by two heavy bearings. Pistons 82 operate in radial bores in the cylinder block which also contains oil inlet and outlet ports. Two cam rings 83 on cam rollers are located in rotating housing 80. The force developed by pistons 82 is transmitted to the two cam rings 83 by two cam rollers 85. A distributor valve 87 in the center of the cylinder block directs high pressure oil to the pistons during their work strokes, and collects low pressure oil during their return stroke.

Each set of wheels is driven through a hydrostatic drive system which powers the wheel hub hydraulic motors mounted in the hub of each wheel assembly. Hydraulic lines, not shown, for the motors are routed vertically through a center steering shaft within each leg 38 and are connected to a hydraulic swivel, also not shown, at the top of each shaft (i.e. below wheel direction indicators 66.) For the Hagglund type motor, the hydraulic swivel consists of four ports (pressure, tank, case pressure, and case drain). Using an hydraulic swivel allows 360 degree rotation of the steering shaft without the twisting of hydraulic lines which route hydraulic fluid to the hydraulic hub motors.

At the top of the vehicle above each of the four steering shafts within legs 38 (the steering shafts may be approximately 12 feet long) and above the hydraulic swivel is located an hydraulic/mechanical steering system, beneath indicator 66, consisting of a high torque variable displacement hydraulic motor, drive sprocket, chain drive, and steering sprocket, for example. The high torque variable displacement hydraulic motor and drive sprocket is attached to the top frame of the vehicle. The driven sprocket is attached to the steering shaft above the hydraulic swivel. Any suitable drive means/mechanism can be used. Each of the four high torque variable displacement hydraulic steering motors can be controlled independently, individually, or hydraulically integrated to produce typical ackerman steering as required for all modes of steering including conventional front wheel steer, rear wheel steer, oblique steering, crab steering, or circular pivot steering wherein wheels on diagonals are hydraulically integrated and rotated to produce circle steering.

The four high torque hydraulic steering motors are integrated through an electrical feedback steering shaft position sensing circuit which feeds steering shaft positioning information (from a selected control steering shaft) to a micro processor. The three remaining steering shaft high torque variable displacement hydraulic motors are controlled from the micro processor which controls an electric solenoid attached to each motor "swash plate" for controlling hydraulic fluid displacement and resulting rotation of each steering drive sprocket.

The micro processor functions as the steering mode selector in that various steering functions displayed at the operator's console can be electrically selected. The micro processor then integrates the steering shaft electrical feedback and hydraulically integrates individual steering motor functions to produce ackerman steering for that steering mode function.

Various modes of operation of the 360 degree full traverse steering/hydraulic drive system is illustrated in FIG. 8. The offset yoke (i.e., offset caster) 21 and the 360 degree steering of wheel assemblies 16, 17, 18 and 19 offers wheel positioning alternatives and steering options which greatly facilitate container handling in surf-zone, marginal terrain and container storage area operations, as well as for pickaback transportability. As shown in FIG. 8, the wheels may be position: (A) for normal operation, (B) in an extended wheelbase position for severe terrain, and (C) in shortened wheelbase position for close quarters. The wheels may also be positioned: (D) with wheel yokes turned inboard for narrow passages, vehicle storage, and pickaback capability (i.e., for transportation aboard a truckbed), and (E) for lateral movement (90 degree turn from normal operation configuration). Offset caster optional steering, in conjunction with the positions mentioned above, also may be provided, as shown in FIG. 8, as follows for: (F) conventional steering, (G) rear wheels steering, (H) oblique steering, (I) crab steering (i.e., for extracting containers stored end-to-end in rows), and (J) for tight radius turning within the vehicle length. The foregoing types of steering operations provide maneuverability not heretofore available in container handling vehicles.

Figure 9:
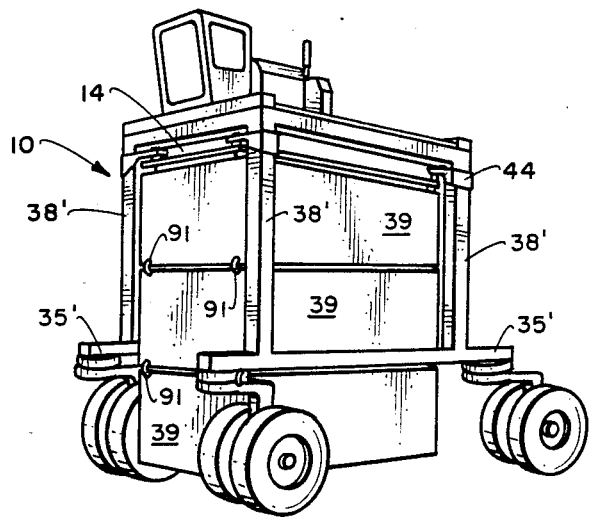
FIG. 9 illustrates another embodiment of the straddle-lift vehicle with heightened vertical members to accommodate 3-high container stacking and extended lower sidebeams to provide a longer wheelbase.
Figure 10:
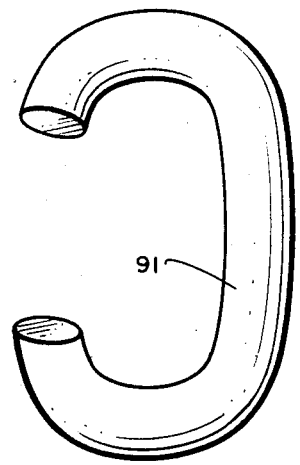
FIG. 10 is an illustration of a large chain link having a section removed for use as a cargo container joiner link in multiple container carrying as illustrated in FIG. 9.
Figure 11:
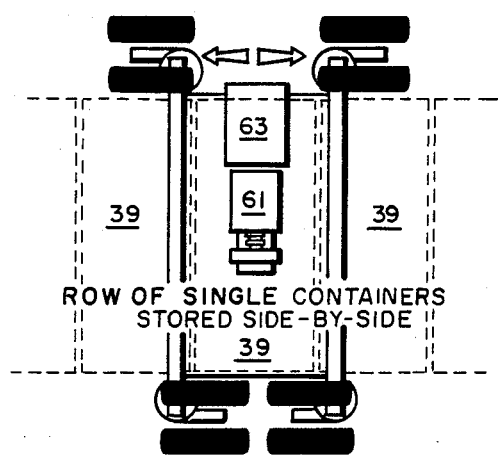
FIG. 11 illustrates use of the vehicle shown in FIG. 9 for insertion and/or removal of cargo containers stored in a single row side-by-side.

A modification of the basic marginal terrain straddle-lift container handler for use at temporary storage sites on ungraded natural terrain is shown in FIG. 9. The modified vehicle which is capable of 3-high container stacking incorporates heightened vertical members 38' (i.e., legs) in the intermediate section and extended stringpieces 35' (i.e., lower sidebeams) to provide a longer wheelbase for accommodating 3-container payloads. By using container joiner links 91 (shown in enlarged detail in FIG. 10) up to three containers 39 can be transported at one time with a ground clearance of 2 feet, for example. Container joiner links can be made from 8 inch chain links with a section removed as illustrated in FIG. 10, for example. With the modification shown in FIG. 9 lateral movement along, and extraction from (or replacement to) rows of cargo containers stored side-by-side is readily accomplished. This type of maneuverability is illustrated in FIG. 11. The 3-high modification of FIG. 9 may also be used to provide mobile overhead winch operations for construction purposes, as well as break-bulk cargo transfer, etc.

Figure 12:
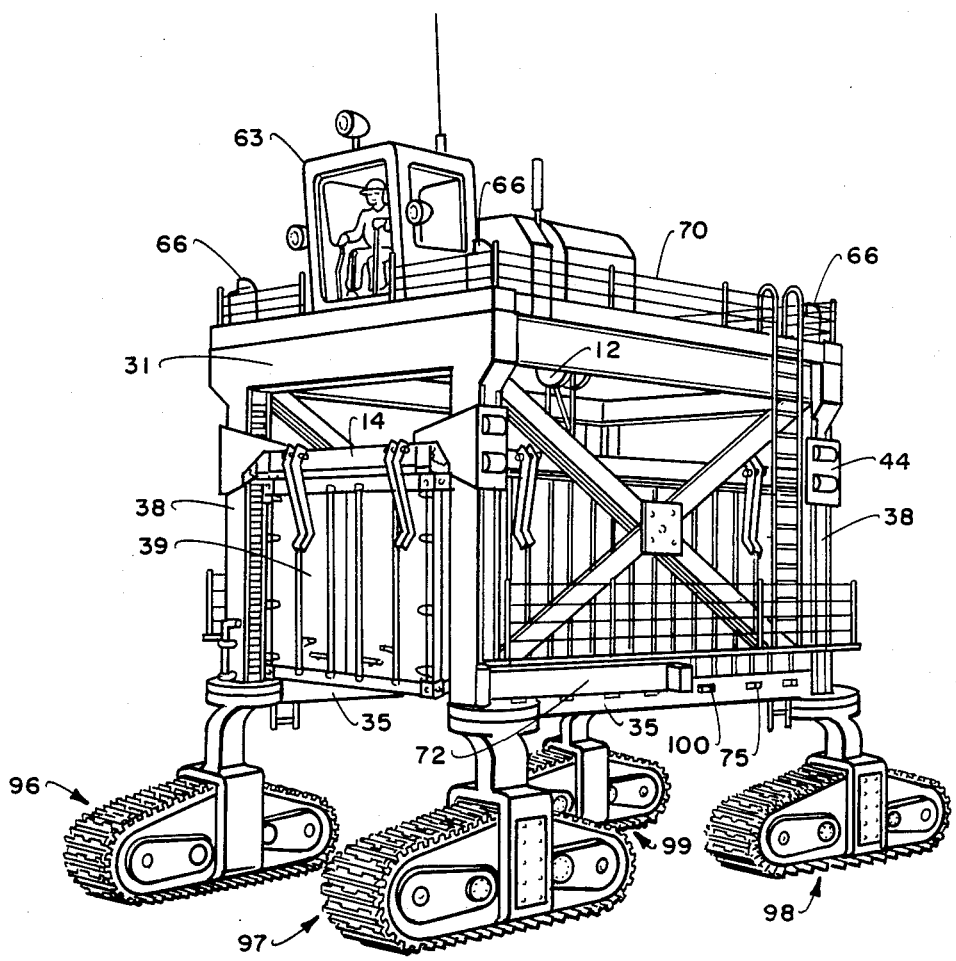
FIG. 12 is an illustration of a tracked version of the vehicle shown in FIG. 1, modified with changeable tractor assemblies in place of wheels, and showing a cargo container being transported.

Another modification to the m rginal terrain straddle-lift container handler is illustrated in FIG. 12. This modification is basically a tracked version of the vehicle shown in FIG. 1, where tractor assemblies 96, 97, 98 and 99 replace the wheel assemblies used in FIG. 1, for use on terrain not suitable for wheel assemblies using high flotation tires. The tractor assemblies are also hydraulically driven. The interchangeability of tractor assemblies for the wheel assemblies provides for even greater flexibility in the use of the vehicle on difficult and steep terrain. Insertable cross bars 100 may be inserted through slots 75 from one side of the vehicle to the other beneath a cargo container 39, for long hauls, etc., as previously discussed.

Operationally, the marginal terrain container handler directional control and container handling operations are controlled by a single operator from within cab 63 located topside above the spreader bar assembly 14 for direct observation in spreader bar positioning. The orientation of all wheel assemblies 16, 17, 18 and 19 are indicated by wheel direction indicators 66 as well as electronically inside the cab. The various modes of steering (as shown in FIG. 8) are selected and controlled from inside the cab. The container handler vehicle 10 is powered by diesel/hydraulic power supply 20 of approximately 350 hp, for example. The final drive, the hoist 12, and the steering functions are all hydraulic hydrostatic operated. Hydraulic lines (not shown) are encased in the structural frame for protection in hostile environments. The hydrostatic motors are conveniently located in the hub of each wheel assembly, as previously described, and the offset wheel assemblies provide for variable track width selectivity, using the various steering options cited. The hoisting is accomplished through the hydraulic winch 12. The spreader bar system is guided and controlled in the vertical direction by the pawl and pawl arrester mechanisms located at each of four corners of the lift vehicle. The pawl assemblies travel vertically along tracks on the inner faces of the four corner posts. The traveling pawls ratchet upward along the tracks guided by the rollers on the outside of the corner posts. Each load is lifted hydraulically and held in position mechanically by the pawl arresters once lifted into position for travel. In addition, the load can be secured for rough terrain movement using the movable cross braces 72 to ensure structural adequacy. Greater roll stability can be achieved for rough terrain by rotating the wheel clusters 180 degrees maximizing the wheel base as discussed (see (A) FIG. 8); likewise, the wheel base can be decreased for close quarters operations and transportability by rotating the wheel clusters inward 180 degrees (see (C) FIG. 8), etc.

The load is hoisted/lowered hydraulically but supported and locked in place during transit mechanically (i.e. the hoist mechanism is not dependent upon to hold the load during transit as in commercial straddle-lift operations). The hoist mechanism is a backup redundant load support system during travel secondary to the mechanical pawl locking system.

The on demand hydrostatic propulsion system and the offset all wheel 360 degree coordinated steering provides a unique directional control capability specifically suitable for container marshalling operations requiring movement among containers that are specifically stacked in configurations which maximize use of ground area and accessibility. This machine of the present invention can be directionally controlled in paths not negotiable by prior art container handling equipment.

Obviously many modifications and variations of the present invention are possible in light of the above teachings. It is therefore to be understood that within the scope of the appended claims the invention may be practiced otherwise than as specifically described.

What is claimed is:

1. A straddle carrier vehicle for handling standardized cargo containers and outsized loads over rough, unleveled and unprepared soils, comprising:
   a. an inverted U-shaped rectangular frame structure consisting of a pair of vertically extending legs at either end and longitudinal upper and lower side beams at either side that define an elongated container carrying bay;
   b. said U-shaped rectangular frame structure being supported at respective corners thereof by independent hydraulically operated transport assemblies each of which is operable to be independently rotated by 360 degrees about a respective steering axis of rotation for any variety of positioning and steering modes;
   c. each said transport assembly including locomotion means, an offset yoke means attached to said locomotion means for locating the locomotion means at a distance offset from its steering axis of rotation, and independent hydrostatic drive motors for driving the locomotion means;
   d. a cargo latch-on spreader frame means operable to be removably connected to said vertically extending legs and to be raised and lowered vertically the height of said legs, and locked into any desired position along said legs;
   e. hoist means located on said straddle carrier vehicle operable to raise and lower said spreader frame means with and without cargo, and operable to separately hoist break-cargo loads without the use of said spreader frame means;
   f. power supply means located on said straddle lift vehicle for operating said hoist means and said hydrostatic drive motors, and for positioning and steering said transport assemblies;
   g. control means for said power supply means, including wheel position selecting means located at an operator's console and wheel position indicator means located on said straddle carrier vehicle;
   h. hinged transverse structure reinforcing means being provided fore and aft on said straddle vehicle and operable to be used for reducing torsion and bending moments of the vehicle structure, particularly when operated over rough and uneven terrain;
   i. said offset yoke means and the independent 360 degree steering of each of said transport assemblies operating to allow the straddle lift vehicle wheelbase to be changed from normal to an extended wheelbase for severe terrain operations, and to a shortened wheelbase for close quarters; also, allowing positioning of said transport assemblies inboard for narrow passage transporting and outboard for normal operation, and at 90 degrees to normal for lateral movement of the straddle lift vehicle; and allowing conventional front steering as well as rear locomotion means sterring, oblique steering, crab steering, and tight radius steering for rotating the straddle lift vehicle within its own length.

2. A straddle lift vehicle as in claim 1 wherein said locomotion means are wheels with high flotation tires.

3. A straddle lift vehicle as in claim 1 wherein said locomotion means are tractor tread devices.

4. A straddle lift vehicle as in claim 1 wherein said spreader frame means includes a pawl and roller assembly which rides on each of said legs and which operates to position and lock said spreader frame means and any cargo load into a desired position on the straddle lift vehicle.

5. A straddle lift vehicle as in claim 1 wherein said spreader frame means includes guide means located about said spreader frame means which assist in the positioning and loading of cargo containers.

6. A straddle lift vehicle as in claim 1 wherein insertable means are provided between said lower side beams for break-bulk cargo handling, long cargo hauling and cargo handling on severe terrain.

7. A straddle lift vehicle as in claim 1 wherein said lower side beams are extended for providing a longer normal wheelbase to accommodate greater size cargo loads.

8. A straddle lift vehicle as in claim 1 wherein said cargo carrying bay is defined to carry a standardized 8 foot by 8 foot by 20 foot cargo container.

9. A straddle lift vehicle as in claim 8 wherein said lower side beams are extended to provide for a longer than normal wheelbase to accommodate standard cargo containers up to 8 foot by 8 foot by 45 foot long.

10. A straddle lift vehicle as in claim 1 wherein said vertically extending legs incorporate extensions to permit multiple container stacking and transporting.

11. A straddle lift vehicle as in claim 10 wherein joiner link means are used for connecting multiple stacked cargo containers together for transporting.

12. A straddle lift vehicle as in claim 1 wherein said hoist means, said power supply means and said operator's console are located atop the straddle carrier vehicle for more efficient operation and to provide a clear view of cargo containers for marshalling, moving and stacking the cargo containers.

13. A straddle lift vehicle as in claim 1 wherein said locomotion means are dual wheels with high flotation tires.

14. A straddle lift vehicle as in claim 1 wherein each of said hinged transverse structure reinforcing means are pivotally mounted on a leg and locked to an opposite leg.

15. A straddle lift vehicle as in claim 1 wherein said operator's console is located on the top of said vehicle.

16. A straddle lift vehicle as in claim 15 wherein said wheel position indicator means are located on an upper portion of said vehicle corners.

* * * * *